Jan. 8, 1952   P. KROHNERT   2,581,867
REFRIGERATED MILK DELIVERY VEHICLE
Filed April 26, 1950

INVENTOR.
Paul Krohnert
BY
Alex. E. MacRae
Attorney.

Patented Jan. 8, 1952

2,581,867

UNITED STATES PATENT OFFICE 2,581,867

REFRIGERATED MILK DELIVERY VEHICLE

Paul Krohnert, West Hill, Ontario, Canada

Application April 26, 1950, Serial No. 158,187
In Canada February 20, 1950

5 Claims. (Cl. 62—117)

This invention relates to refrigerated vehicles for delivery of milk and the like.

It has frequently been proposed in the past to provide refrigerated vehicles for the transportation or delivery of perishable food products. The use of refrigerated motor trucks and like vehicles for the delivery of milk and dairy products has not been widespread, however, chiefly because of the impractical nature and prohibitive cost of such vehicles.

It is an object of the present invention to provide a refrigerated motor vehicle for the delivery of milk or the like, such vehicle having a structure arranged to ensure and promote an improved efficiency and economy in the handling of food products and to safeguard in greater degree the quality of such products during handling.

The invention thus contemplates the provision of a motor vehicle for handling cases of food products, such vehicle having an operator's cab, a refrigerated compartment accessible from the cab, an empty case-receiving compartment also accessible from the cab, and means in the cab for supporting a plurality of such cases in readily available relation to the operator.

Figure 1:
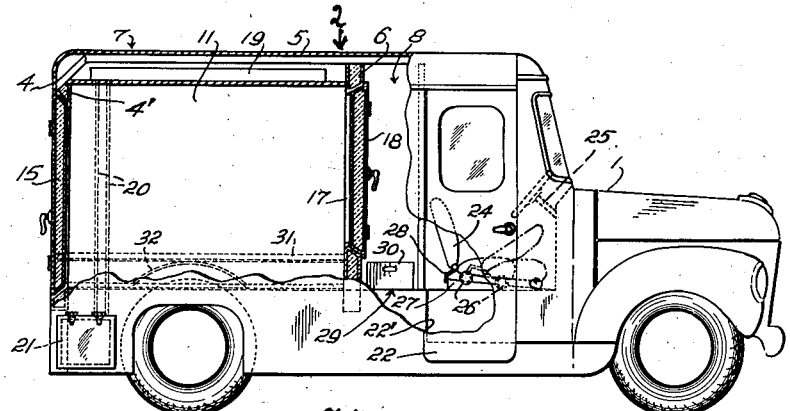
Figure 2:
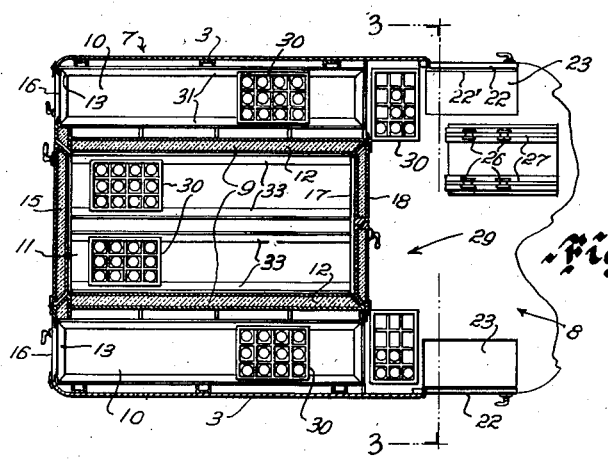
Figure 3:
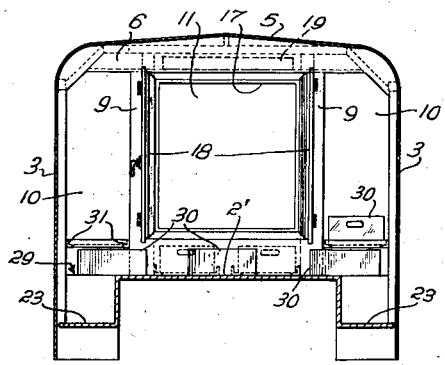
Figure 4:
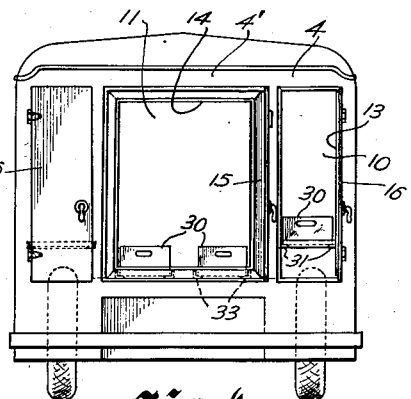

The invention will be described with reference to the accompanying drawing, in which:

Figure 1 is a side elevation, partly in section, of a vehicle in accordance with the invention, Figure 2 is a partial sectional plan view, Figure 3 is a partial sectional elevation of the forward end of the vehicle, and Figure 4 is a sectional elevation of the rearward end of the vehicle.

In the drawing, 1 is a motor truck chassis of usual construction, and 2 a body constructed thereon in accordance with the invention.

The body comprises a floor 2', vertical side walls 3, a vertical rear wall 4, and a top wall 5. A transversely extending partition 6 adjacent the forward end of the body divides the interior of the body into a main load-carrying rearward section 7 and a forward operator's cab 8. Two partitions 9 each extending from the rear wall 4 to partition 6 divide section 7 into three longitudinally extending compartments, the outer two 10 of which are of substantially equal width and the inner one 11 of which is of substantially twice the width of a compartment 10. Each partition 9 is of an insulating character, having insulation 12 incorporated therein throughout its extent.

The rear or outside end of each compartment 10 and 11 has a respective opening 13 and 14. Each opening is substantially as wide as the compartment and extends from approximately the floor level throughout the major portion of the height of the compartment.

The rear wall portion 4' of compartment 11 is of insulating character. Opening 14 is provided with a door 15, which is also insulated. Openings 13 are provided with respective doors 16.

The forward or inside ends of compartments 10 are substantially fully open. The forward or inside end of compartment 11 has an opening 17 which is substantially the full width of the compartment and which extends throughout the major portion of the height of the compartment from a lower level spaced above floor 2' to an upper level spaced below top wall 5. Opening 17 is provided with an insulated door 18, which is preferably in two sections as shown.

From the foregoing description, it will be appreciated that compartment 11 is substantially fully insulated. In accordance with the invention, such insulated compartment is refrigerated in any suitable manner. As shown, a standard cold plate 19 is mounted in the upper portion of the compartment, the plate being connected through pipes 20 to a suitable source of refrigerant, such as a compressor 21 mounted on the vehicle.

The operator's cab 8 is generally of the same height as that of section 7, such height being preferably sufficient to permit the operator to assume a substantially upright or standing position in the cab. Each side of the cab is provided with a door opening 22' and a door 22, which is preferably of the sliding type, as shown. A step 23 leads from the lower level of each door to the floor 2' of the cab. A bucket type operator's seat 24 is provided and preferably such seat is forwardly movable to a position under the steering wheel 25, when not in use. As shown, the seat is mounted on rollers 26 which engage a pair of inclined tracks 27. Means 28 for locking the seat in driving position may be provided, and on release of such means, the seat slides forwardly automatically. Such forward movement of the seat is of convenience to the operator in providing extra space in the cab for load-handling and also in providing a clear passage between the doors 22. Preferably, there is also in the cab a free floor space 29 rearwardly of the doors 22 and adjacent transverse partition 6.

The truck body in accordance with the invention is particularly applicable to the delivery of milk. As is well known, milk is usually handled for delivery purposes in cases, each of which is arranged to contain several bottles. A number of such cases is indicated at 30 in the drawing. For the handling of such cases, it is preferable that each compartment 10 be provided with a pair of laterally aligned longitudinally extending case-supporting rails 31, such rails being about 13½" apart to support a standard case thereon. It will be observed that the rails are spaced somewhat above the floor level of the body in order to clear the wheel housings 32. Also preferably, compartment 11 may have two pairs of laterally aligned case-supporting rails 33 mounted on the floor thereof, the latter rails being adapted to facilitate efficient and convenient arrangement of cases in the compartment 11. It will be apparent that the arrangement contemplated consists in the stacking of the cases in two longitudinal rows. It is substantially important that, for the efficient handling and delivery of milk, the truck body follow to some degree certain dimensional requirements. The following dimensions are given by way of example:

Compartment 11—
   Height 58"
   Width 30"
   Length 84"
Each compartment 10—
   Height (above rails 31) 50"
   Width 16½"
   Length 84"
Size of openings 13—16½" x 50½"
Size of opening 14—30" x 50½"
Size of opening 17—30" x 40½"
Distance of opening 17 from floor level—13"
Size of door opening 22'—25" x 67"
Distance between floor level and top wall 5—61"
Distance between rear edge of door opening and partition 6—12"

The preferred manner of utilizing the vehicle described is as follows:

The freshly pasteurized or otherwise processed milk is, directly following bottling and casing, loaded into the refrigerated compartment 11 through rear door 15. This will usually be carried out during the evening or night hours, and the truck will then be stored until delivery of milk begins the following morning. During the period of storage, the cold plate 19 is connected directly to the main refrigeration outlet of the dairy plant or the compressor 21 is connected to an electric current outlet to operate the same. When the truck operator begins delivery, the connection is disconnected, the cold plate 19 being sufficiently charged for the day's run.

During delivery procedure, the operator may remove, say, three cases at a time from compartment 11 through inside door 18, the free floor space 29 being provided to accommodate such cases and to constitute a sales platform. The lower edge of door 18 is spaced a sufficient distance above the floor level, as shown, to clear the top of a case positioned therebelow. Removal of at least three cases at a time reduces very greatly the number of times the refrigerated compartment must be opened during delivery procedure. Thus, considerable economy and efficiency in refrigeration thereof results. As each case is emptied, it is stacked in one or other of the open compartments 10.

Following completion of the delivery procedure, the empty cases are removed from compartments 10 through the rear doors 16, and the re-loading compartment 11 proceeded with as above outlined.

What is claimed is:

1. A vehicle body for the handling of cases of milk and delivery therefrom comprising a floor and top, side and rear walls, a transversely extending partition dividing the body into a forward operator's cab and a rearward load-carrying section, a pair of insulated partitions extending longitudinally of said rearward section and dividing the latter into a central insulated compartment and a pair of outer compartments, a plurality of doors in said rear wall one leading into one only of each of said compartments, said transverse partition having therein a door leading into said central compartment and an opening free from closure means leading into each of said outer compartments, and a cold plate mounted in said central insulated compartment for refrigerating the latter, said outer compartments being unrefrigerated, said central compartment being arranged to receive a plurality of full cases of milk, and said outer compartments having a combined capacity substantially equal to that of said central compartment to receive all of the cases from the central compartment when empty.

2. A vehicle body for the handling of cases of milk and delivery therefrom comprising a floor and top, side and rear walls, a transversely extending partition dividing the body into a forward operator's cab and a rearward load-carrying section, a pair of insulated partitions extending longitudinally of said rearward section and dividing the latter into a central insulated compartment and a pair of outer compartments, a single pair of longitudinally extending supporting rails in each of said outer compartments to receive a single stack of cases, two pairs of longitudinally extending supporting rails in said central compartment to receive a double stack of cases, the combined case-receiving capacity of said outer compartments thereby being substantially equal to that of said central compartment, said transverse partition having therein a door leading to said central compartment and an opening free from closure means leading to each of said outer compartments, a plurality of doors in said rear wall one leading into one only of each of said compartments, and a cold plate mounted in said central insulated compartment for refrigerating the latter, said outer compartments being unrefrigerated.

3. A vehicle body as defined in claim 2, said cab having a free floor space adjacent said transverse partition, the lower end of said door in the transverse partition being spaced above the floor in the cab a distance of at least thirteen inches whereby said door may swing over cases lying on said floor space.

4. A vehicle body for the handling of cases of milk and delivery therefrom comprising a floor and top, side and rear walls, a transversely extending partition dividing the body into a forward operator's cab and a rearward load-carrying section, a pair of insulated partitions extending longitudinally of said rearward section and dividing the latter into a central insulated compartment and a pair of outer compartments, a plurality of doors in said rear wall one leading into one only of each of said compartments, said transverse partition having therein a door leading only into said central compartment and an opening leading into each of said outer compartments, and refrigerating means in said central insulated compartment for refrigerating the latter, said outer compartments being unrefrigerated, said central compartment being arranged to receive a plurality of full cases of milk, and said outer compartments having a combined capacity substantially equal to that of said central compartment to receive all of the cases from the central compartment when empty.

5. A vehicle body as defined in claim 4, said cab having a door in each side wall in opposite relation to each other and having a free floor space rearwardly of said cab doors and adjacent said transverse partition, said floor space having a width of at least twelve inches to receive at least one of said cases, the lower end of said door in the transverse partition being spaced above the floor in the cab a distance of at least thirteen inches whereby said partition door may swing over a case lying on said floor space.

PAUL KROHNERT.

REFERENCES CITED

The following references are of record in the file of this patent:

UNITED STATES PATENTS

| Number | Name | Date |
|---|---|---|
| 1,511,451 | Folger | Oct. 14, 1924 |
| 1,533,354 | Stahl | Apr. 14, 1925 |
| 2,007,595 | Brykczynski | July 9, 1935 |
| 2,108,104 | Cordrey | Feb. 15, 1938 |
| 2,125,205 | Snowden | July 26, 1938 |
| 2,330,339 | De More | Sept. 28, 1943 |